(12) United States Patent
Abe

(10) Patent No.: US 6,445,870 B1
(45) Date of Patent: *Sep. 3, 2002

(54) IMAGE COMPRESSION AND EXPANSION DEVICE

(75) Inventor: Nobuaki Abe, Hokkaido (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 50 days.

(21) Appl. No.: 08/919,352

(22) Filed: Aug. 28, 1997

(30) Foreign Application Priority Data

Aug. 29, 1996 (JP) .............................................. 8-247258

(51) Int. Cl.[7] .............................................. H04N 11/02
(52) U.S. Cl. ........................ 386/33; 386/38; 348/396.1; 382/166; 382/232
(58) Field of Search ........................... 348/390.1, 391.1, 348/393.1, 396.1, 409.1, 410.1, 411.1, 412.1, 415.1, 420.1; 382/166, 232, 236, 238, 248, 250, 251; 386/33, 38; 358/906, 909.1; 345/150, 153, 154

(56) References Cited

U.S. PATENT DOCUMENTS 5,336,844 A * 8/1994 Yamauchi et al. .......... 386/102
5,398,066 A * 3/1995 Martinez-Uriegas ........ 348/393
5,497,246 A    3/1996 Abe
5,666,209 A    9/1997 Abe
5,708,509 A    1/1998 Abe
5,787,192 A * 7/1998 Takaichi et al. ............. 382/166
5,901,242 A * 5/1999 Crane et al. ................. 382/166
6,005,982 A   12/1999 Abe
6,047,089 A    4/2000 Abe
6,049,634 A    4/2000 Abe

FOREIGN PATENT DOCUMENTS

JP            7135568         5/1995

* cited by examiner

Primary Examiner—Thai Tran
Assistant Examiner—Christopher Onuaku
(74) Attorney, Agent, or Firm—Greenblum & Bernstein P.L.C.

(57) ABSTRACT

The image compression and expansion device handles pixel data (R, G, B) which are generated according to the 256-color mode. The pixel data are compressed and recorded in a recording medium. Palette information, composed of color data of the 256-color mode, are converted to data which are conformed to a predetermined format, and are recorded in the recording medium. The compressed image data and the palette information, which are recorded in the recording medium, are read therefrom, so that the compressed image data are expanded to reproduce the pixel data. In this expansion process, based on the reproduced pixel data, color data, which correspond to the pixel data and are contained in the palette information, are selected.

7 Claims, 5 Drawing Sheets

FIG. 2

PALETTE INFORMATION "MC"

| Index | R | G | B |
|---|---|---|---|
| 1 | 67 | 66 | 36 |
| 2 | 72 | 71 | 49 |
| 3 | 72 | 69 | 55 |
| 4 | 71 | 84 | 57 |
| 5 | 82 | 82 | 53 |
| 6 | 95 | 75 | 45 |
| 7 | 82 | 90 | 49 |
| 8 | 90 | 94 | 49 |
| 9 | 72 | 68 | 66 |
| 10 | 90 | 78 | 57 |
| ... | ... | ... | ... |
| 255 | 143 | 162 | 179 |
| 256 | 149 | 164 | 203 |

IMAGE COMPRESSION AND EXPANSION DEVICE

BACKGROUND OF THE INVENTION

1. Field of the Invention

The present invention is related to a device which compresses color still image data, for example, in accordance with a JPEG (Joint Photographic Expert Group) algorithm, and records the compressed image data in a recording medium and, also, to a device which reads the compressed image data from the recording medium and expands the compressed image data to reproduce the color still image.

2. Description of the Related Art

A standard algorithm, for the encoding of high resolution images and the transfer of that information through telecommunication transmission channels, has been recommended by the JPEG. In order to enable a large-scale data compression, the baseline process of the JPEG algorithm breaks down the original image data into components on a spatial frequency axis using a two-dimensional discrete cosine transformation (two-dimensional DCT) process. Thereafter, the data expressed on the spatial frequency axis is quantized by using a quantization table. The quantized data is then encoded using a Huffman table to generate compressed image data, which are recorded in a recording medium.

When the original image is reproduced from the compressed image data, an inverse process to that described above is performed. Namely, the compressed image data are decoded, are dequantized using the quantization table, and are then subjected to a two-dimensional inverse discrete cosine transformation (two-dimensional IDCT).

In the JPEG algorithm, a color image is compressed or expanded using the full-color mode in which 16,000,000 colors are used. Therefore, the JPEG algorithm can be applied to a wide range of image process systems, from a low resolution display system to a high resolution display system.

For example, when a color image of 256-color mode, generated by a personal computer, is compressed according to the JPEG algorithm, and then subsequently expanded to reproduce the color image of 256-color mode, a complicated process due to the difference between the full-color mode and the 256-color mode is required. In spite of the complicated process, the reproduced image obtained by the expansion process has a quality lower than the original image before compression, since, in the image compression process performed by the JPEG algorithm, some image information is lost.

SUMMARY OF THE INVENTION

Accordingly, an object of the present invention is to provide an image compression device by which a color image, generated by a mode in which the number of colors is less than that used in the image compression process performed by this image compression device, can be compressed without performing a complicated process and, further, the loss of image information occurring in the image compression process is minimized.

According to the present invention, there is provided an image compression device, a data reading processor, an image compression processor and a data recording processor.

The data reading processor reads pixel data, which is expressed by color data formed by combining a red (R) component, a green (G) component and a blue (B) component, and palette information, which is composed of a predetermined number of the color data. The image compression processor performs a compression process based on the pixel data to generate compressed image data. The data recording processor records the compressed image data and the palette information in a recording medium.

Further, according to the present invention, there is provided an image compression device, in which original image data and palette information are inputted so that the original image data is compressed, the palette information being composed of 256-color data, each of which is formed by combining a red component, a green component and a blue component, the original image data including color data which is allocated to one of the 256-color data, the device comprising an image processor, a transformation processor, a quantization processor, an encoding processor and a data recording processor.

The image processor processes the original image data to generate luminance data and color difference data. The transformation processor performs a two-dimensional discrete cosine transformation to the luminance data and the color difference data to generate DCT coefficients. The quantization processor quantizes the DCT coefficients to generate quantized DCT coefficients. The encoding processor encodes the quantized DCT coefficients to generate compressed image data. The data recording processor records the compressed image data and the palette information in a recording medium.

Another object of the present invention is to provide an image expansion device by which a color image, generated by a mode, in which the number of colors is less than that used in the image compression process performed by this image compression device, and then compressed and recorded in a recording medium, can be expanded without performing a complicated process and, further, the loss of image information occurring in the image expansion process is minimized.

According to the present invention, there is provided an image expansion device which expands compressed image data recorded in a recording medium, in which palette information, composed of a predetermined number of color data formed by combining an R component, a G component and a B component, is also recorded, the image expansion device comprising an image reading processor, an information reading processor, a pixel data reproducing processor and a color data selection processor.

The image reading processor reads the compressed image data from the recording medium. The information reading processor reads the palette information from the recording medium. The pixel data reproducing processor expands the compressed image data to reproduce pixel data. The color data selection processor selects one of the color data, which corresponds to the pixel data and is contained in the palette information, based on R, G and B components forming the pixel data obtained by the pixel data reproducing processor.

BRIEF DESCRIPTION OF THE DRAWINGS

The present invention will be better understood from the description of the preferred embodiments of the invention set forth below, together with the accompanying drawings, in which:

FIG. 2 is a view showing an example of palette information;

DESCRIPTION OF THE PREFERRED EMBODIMENTS

Figure 1:
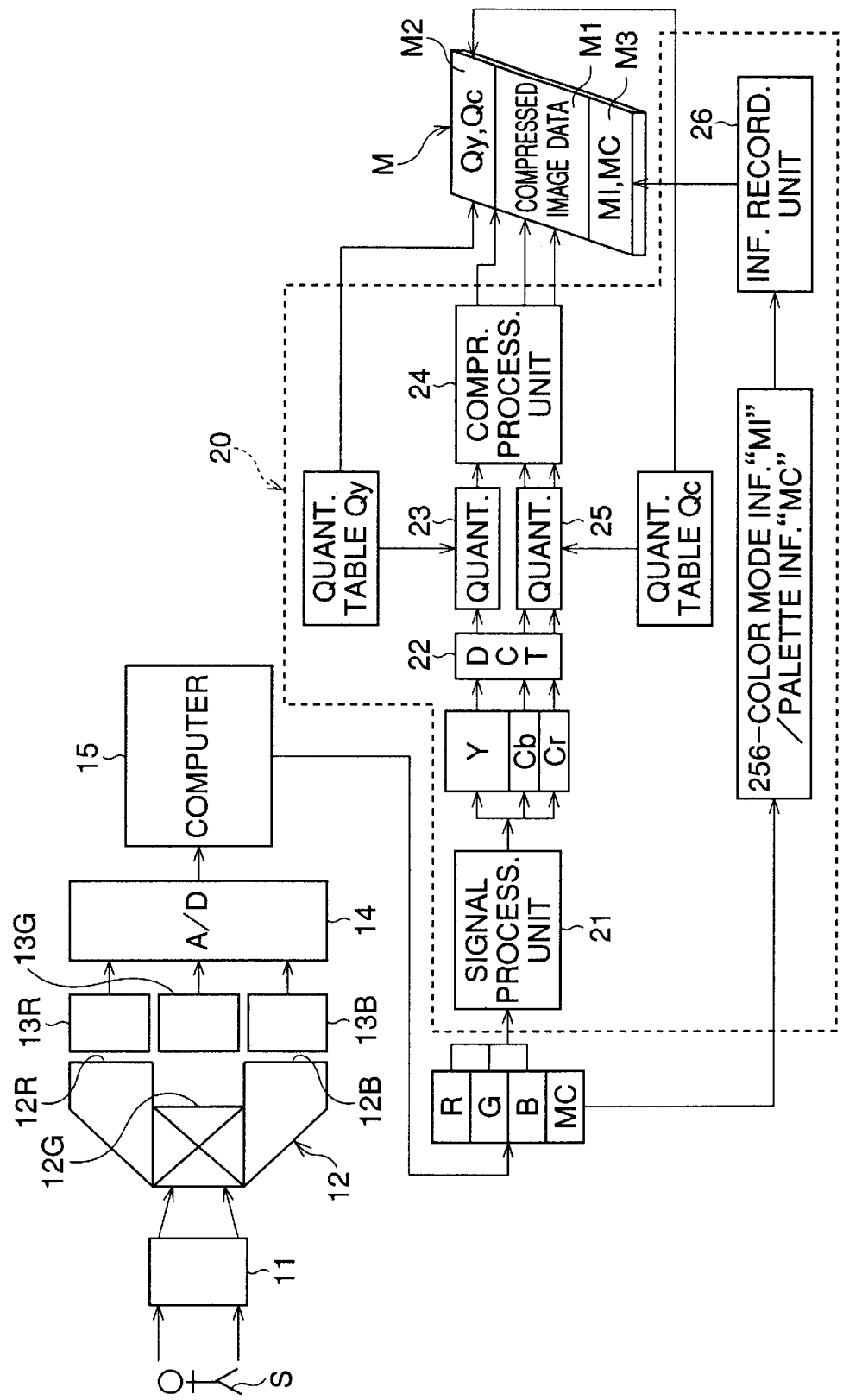
FIG. 1 is a block diagram showing an image compression device of an embodiment of the present invention.

The present invention will be described below with reference to embodiments shown in the drawings.

FIG. 1 is a block diagram of an image compression device of an embodiment of the present invention, by which luminance signals (Y data) and color difference signals (Cb data and Cr data), which correspond to an original color still image, are compressed according to the JPEG algorithm.

Light reflected from a subject S passes through an imaging optical system 11 and enters a dichroic prism 12, so that the light is color-separated into a red (R) light component, a green (G) light component and a blue (B) light component. These light components exit from emergent planes 12R, 12G and 12B, respectively, so that an R image, a G image and a B image, which correspond to a single object image, are formed on the light receiving surfaces of the CCDs (charge coupled device) 13R, 13G and 13B, respectively.

Each of the CCDs 13R, 13G and 13B produces charges, which are representative of the quantity of light incident thereon, and outputs a correcting analog image signal. Each analog image signal is converted to a digital image signal by an A/D converter 14, and thus, the R image data, the G image data and the B image data, in a digital form, are inputted into a computer 15. Then, in the computer 15, each of the R image data, G image data and B image data is subjected to a predetermined process according to an image processing program, so that, for example, a 640×400 pixel data matrix is generated. In the image process program, palette information MC composed of 256-color data formed by combining R, G and B components, as shown in FIG. 2, for example, is used, and each pixel data is allocated to any one color data (i.e., any one "Index" value, in FIG. 2) according to this 256-color mode.

The pixel data (i.e., the original image data), generated as described above, are inputted into the image compression device 20 together with the palette information MC. The pixel data corresponding to the R image data G image data and B image data are converted to luminance data Y and color difference data Cb and Cr in a signal processing unit 21. The luminance data Y and the color difference data Cb and Cr are subjected to a two-dimensional DCT in a DCT processing unit 22, so that a DCT coefficient, for every spatial frequency of the luminance data Y and the color difference data Cb and Cr, is obtained. The DCT coefficients of the luminance data Y are quantized in a quantization processing unit 23, using a quantization table Qy, so that each DCT coefficient is converted to a quantized DCT coefficient. The quantized DCT coefficients of the luminance data Y are then compressed or encoded by a compression processing unit 24, in accordance with the JPEG algorithm, so that the compressed image data are recorded in an image recording area M1 of a recording medium M.

In the JPEG algorithm, the luminance data Y and the color difference data Cb and Cr are compressed using the full-color mode. Namely, the number of color data of the full-color used in the JPEG algorithm is 1,600,000, which is much greater than that of color data contained in the palette information MC of the original image data.

Similar to the luminance data Y, the color difference data Cb and Cr are converted to DCT coefficients in the DCT processing unit 22, and are then quantized in a quantization processing unit 25, using a quantization table Qc, so that each DCT coefficient is converted to a quantized DCT coefficient. The quantized DCT coefficients of the color difference data Cb and Cr are then compressed or encoded by the compression processing unit 24, in accordance with the JPEG algorithm, so that the compressed image data are recorded in an image recording area M1 of a recording medium M.

The quantization tables Qy and Qc, used in the quantization processing units 23 and 25, are default quantization tables, each of which is composed of predetermined quantization coefficients recommended by the JPEG, for example. These quantization tables Qy and Qc are recorded in a first table recording area M2 of the recording medium M.

The palette information MC and the 256-color mode information MI, indicating that the original image data has been generated according to the 256-color mode, are converted, by an image information recording processing unit 26, to data which are conformed to a predetermined format. This data are then recorded in an information recording area M3 of the recording medium M.

FIG. 2 shows an example of the palette information MC. The palette information MC, which is composed of 256-color data, is inherent in every image. The palette information MC is generated according to the image processing program in the computer 15. In FIG. 2, "Index" denotes a serial number of the color data, and "R", "G" and "B" denote luminance values of the R, G and B components, respectively. Each of the luminance values is an integer, from 0 through 255, and a higher number implies a higher luminance value. For example, the first color data denotes that the luminance value of the R component is 67, the luminance value of the G component is 66, and the luminance value of the B component is 36.

The two-dimensional DCT performed in the DCT processing unit 22 and the quantization performed in the quantization processing units 23 and 25 are described below.

The luminance data Y and the color difference data Cb and Cr are divided into a plurality of blocks for one frame image, respectively, so that the luminance data Y and the color difference data Cb and Cr are processed for each block. Note that each of the blocks is composed of an 8×8 pixel data matrix.

Figure 3:
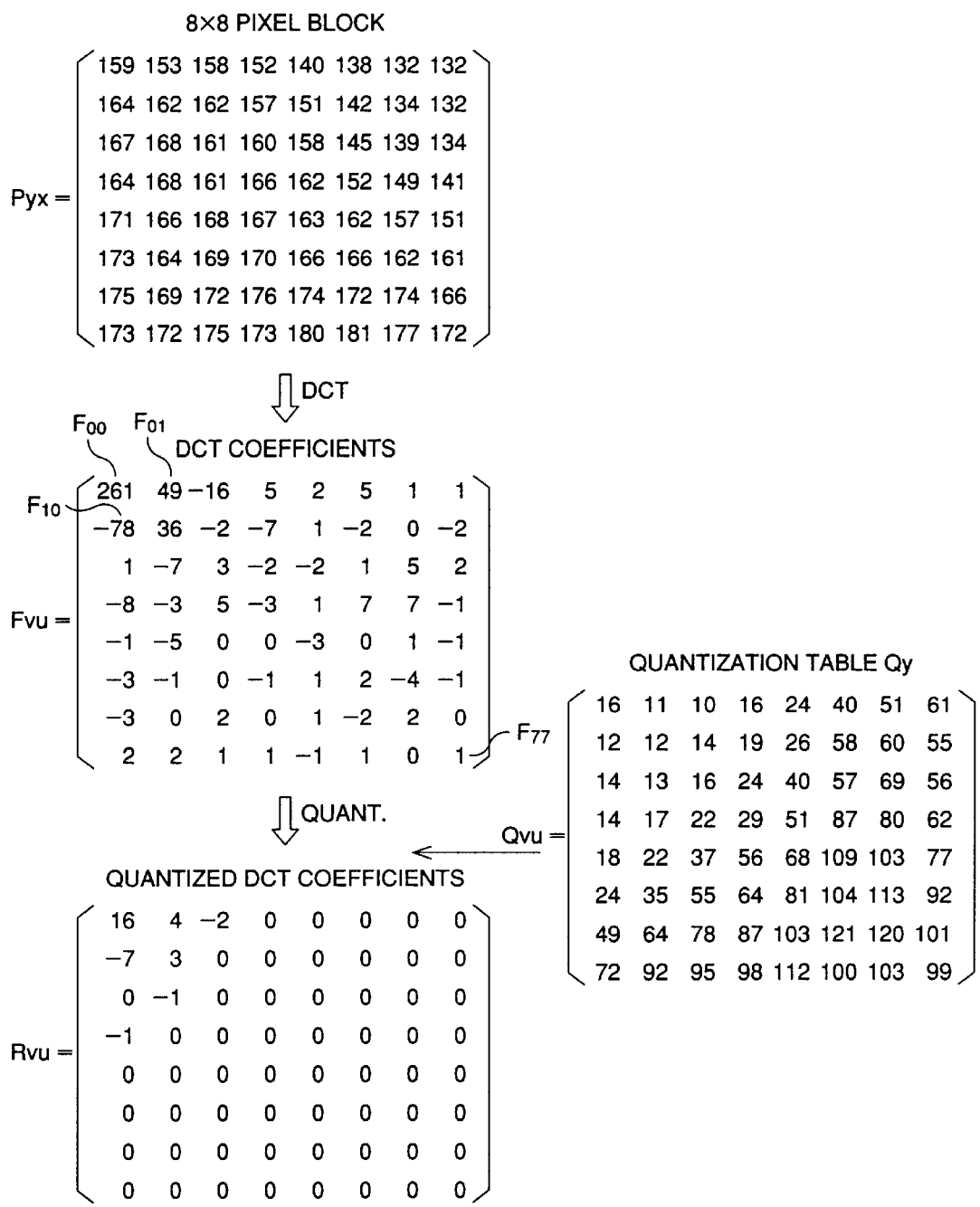
FIG. 3 is a view showing, as an example, pixel values Pyx of an 8×8 pixel block, DCT coefficients Fvu, quantized DCT coefficients Rvu and a quantization table Qvu.

FIG. 3 shows, as an example, pixel values Pyx of an 8×8 pixel block, DCT coefficients Fvu, quantized DCT coefficients Rvu and a default quantization table Qy, for quantizing the luminance data Y. In the pixel values Pyx, "y" indicates the vertical position in the 8×8 pixel block. Values of "y" (0, 1, 2, . . . 7) ascend from a upper-position to the lower-position. The Suffix "x" indicates a horizontal position in the 8×8 pixel block. Values of "x" (0, 1, 2, . . . 7) ascend from left-position to the right-position. The Suffixes "v" and "u" correspond to the vertical and horizontal positions of 64 DCT coefficients, which are arranged in an 8×8 matrix. Values of "v" (0, 1, 2, . . . 7) ascend from an upper-position to the lower-position. Values of "u" (0, 1, 2, . . . 7) ascend from left-position to a right-position.

The pixel values Pyx are converted to 64 (8×8) DCT coefficients Fvu by the two-dimensional DCT. The two-dimensional DCT is expressed by the following equation (1):

$$Fvu = \frac{1}{4} CuCv \sum_{y=0}^{7} \sum_{x=0}^{7} Pyx \cdot \cos\frac{(2x+1)u\pi}{16} \cdot \cos\frac{(2y+1)v\pi}{16} \quad (1)$$

wherein $Cu, Cv = \frac{1}{\sqrt{2}} : u, v = 0$ $= 1 : u, v \neq 0$

Of these DCT coefficients, the DCT coefficient $F_{00}$ at the position (0,0) is a DC (Direct Current) component, while the remaining 63 DCT coefficients Fvu are the AC (Alternating Current) components. The AC components show how many higher spatial frequency components there are, in the 8×8 pixel block of image data, from the coefficients $F_{01}$ and $F_{10}$ to the coefficient $F_{77}$. The DC component shows the average value of the spatial frequency components of the 8×8 pixel block as a whole. Each DCT coefficient Fvu corresponds to a predetermined spatial frequency.

The quantization table Qy is composed of 64 quantization coefficients Qvu. The equation for quantization of the DCT coefficients Fvu, using the quantization table, is defined as follows:

Rvu=round (Fvu/Qvu) (0≤u, v≤7)

The term "round", in this equation, is an approximation function which approximates, to the nearest integer, the value of the argument. Thus, if the argument is less than 0.5, the value is rounded down to the nearest integer. If the argument is greater than or equal to 0.5, the value is rounded up to the nearest integer. For example, the value 3.49 is rounded down to 3, whereas 3.50 is rounded up to 4. Namely, the quantized DCT coefficients Rvu, shown in FIG. 2, are obtained by dividing each of the DCT coefficients Fvu by the corresponding quantization coefficients Qvu, and rounding off.

The quantized DCT coefficients Rvu are subjected to a Huffman encoding and are recorded in the recording medium M. Since the Huffman encoding is well known, a detailed explanation thereof is omitted in this specification.

Figure 4:
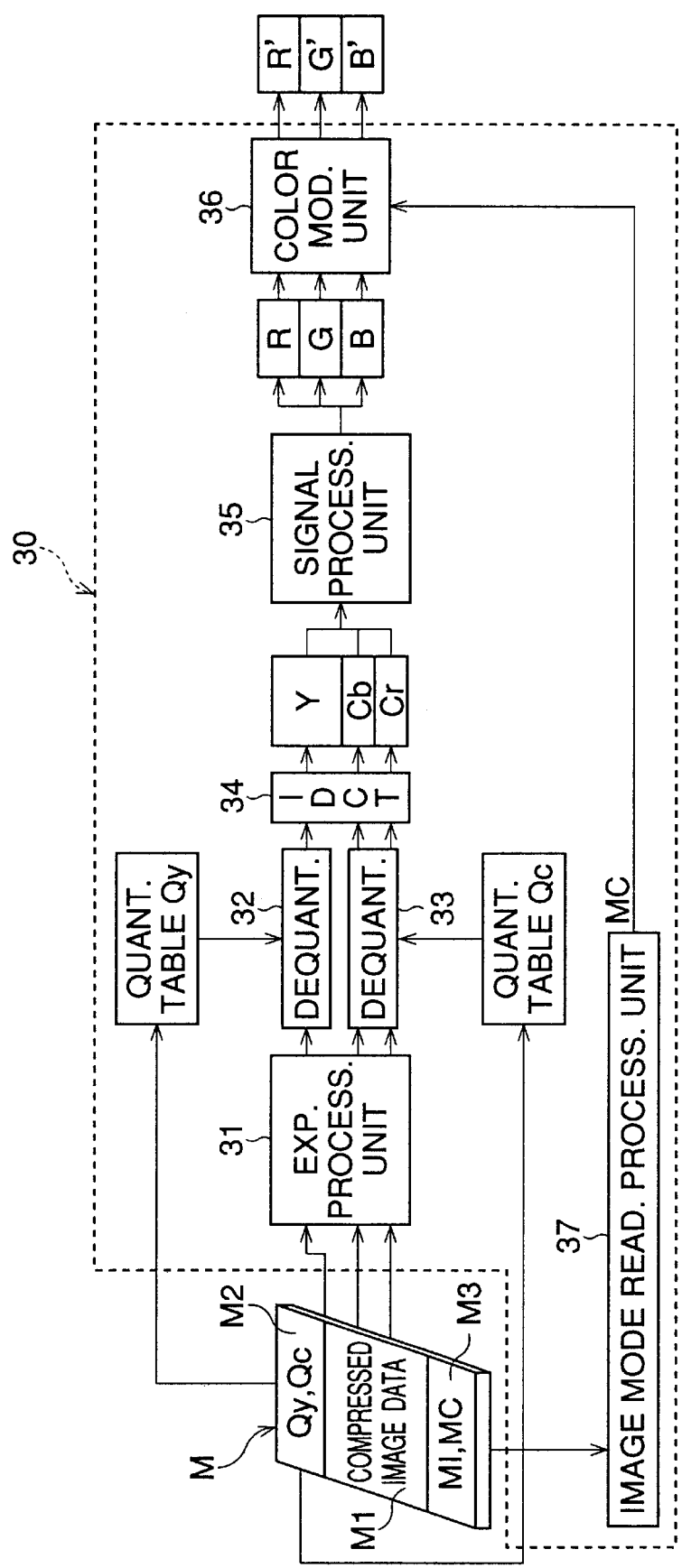
FIG. 4 is a block diagram showing an image expansion device of the embodiment.

FIG. 4 is a block diagram of an image expansion device 30 of the embodiment of the present invention.

The compressed image data of the luminance data Y and the color difference data Cb and Cr, read from the recording medium M, are decoded, in an expansion processing unit 31, and are converted to the quantized DCT coefficients of the luminance data Y and the color difference data Cb and Cr. The decoding is the inverse of the Huffman encoding, which is well known. The quantized DCT coefficients obtained by the decoding are dequantized, in a dequantization processing unit 32 for the luminance data or a dequantization processing unit 33 for the color difference data, using the quantization tables Qy and Qc read from the table recording area M2, so that the quantized DCT coefficients are converted back to the DCT coefficients. These DCT coefficients are then subjected to a two-dimensional inverse discrete cosine transformation (two-dimensional IDCT) in an IDCT processing unit 34, so that the luminance data Y and the color difference data Cb and Cr are reproduced.

The luminance data Y and the color difference data Cb and Cr are converted, by a signal processing circuit 35, to pixel data which have the same number of pixels as that of the original image data, i.e., 640×400 pixels in this embodiment. Each of the pixel data is formed by a combination of the R, G and B components, and is expressed by color data which is defined according to the full-color mode of 1,600,000 colors. Usually, this color data (R, G and B) are not contained in the palette information MC of the 256-color mode used in the image processing program executed by the computer 15.

Therefore, the pixel data are allocated to color data (R', G' and B') contained in the palette information MC, due to an operation of a color modification processing unit 36. For this operation, the 256-color mode information MI and the palette information MC are read from the recording medium M, and the palette information MC is converted based on the 256-color mode information MI, in a mode reading processing unit 37, to data which are conformed to a predetermined format. As described later with reference to FIG. 5, in the color modification processing unit 36, color data, which correspond to the pixel data and are contained in the palette information MC, are selected based on the R, G and B components forming the pixel data. The selected color data (R', G' and B') from the palette information MI are outputted from the image expansion device 30, and are converted, in the computer 15 (FIG. 1), for example, to data which are conformed to a predetermined format, so that the reproduced image is indicated on a display device of the computer.

Figure 5:
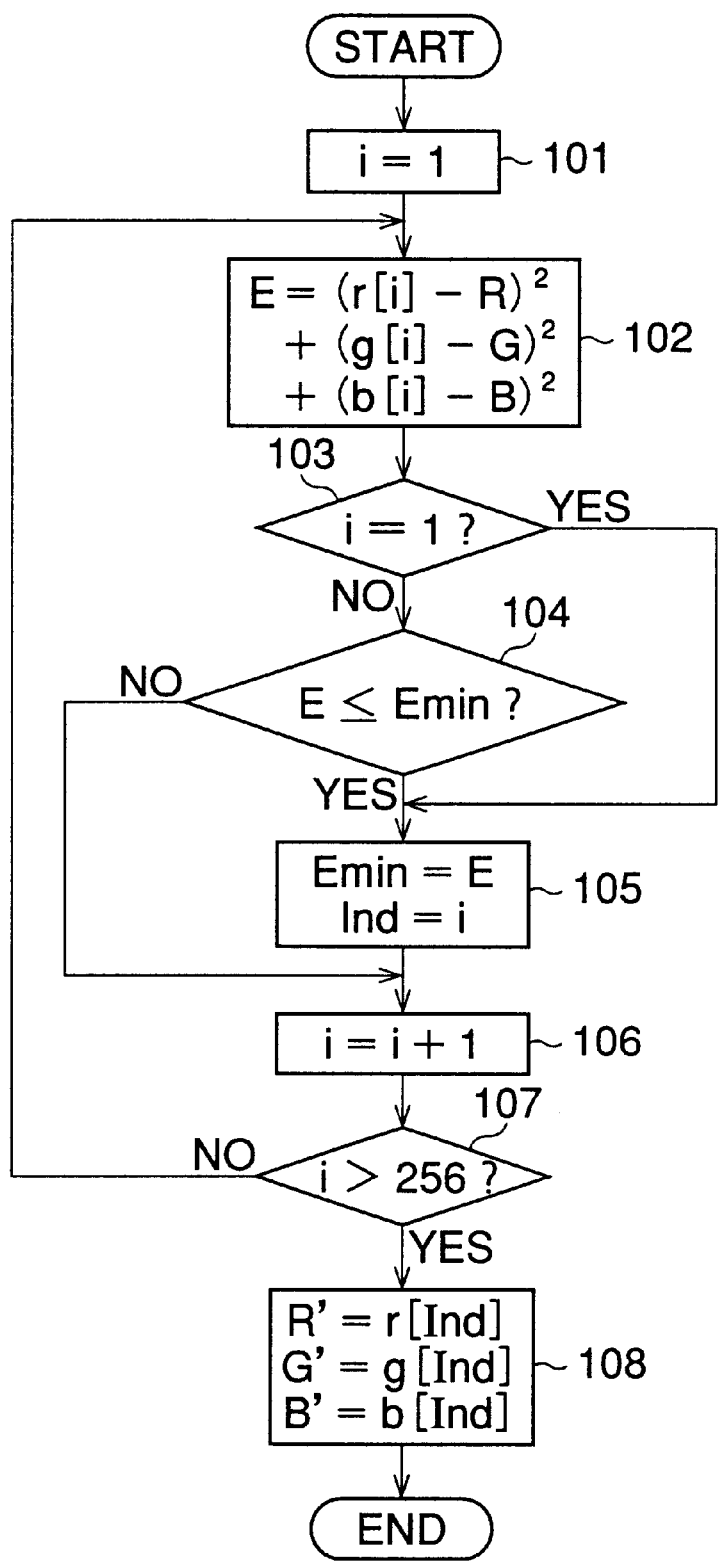
FIG. 5 is a flow chart of a program of a color modification process.

FIG. 5 is a flow chart of a program of a color modification process which is executed in the color modification processing unit 36. This program is executed for every pixel contained in the image reproduced by the signal processing unit 35. For example, when the number of pixel data is 640×400, the program is executed 256,000 times.

In Step 101, a counter "i", which indicates the serial number of the color data contained in the palette information MC, is set to 1. In Step 102, value "E", being the total sum of the square of the difference between the luminance values of the R, G and B components contained in the pixel data, obtained by the signal processing unit 25, and the corresponding luminance values of the R, G and B components contained in the palette information MC, is derived according to the following equation (2):

$$E = (r[i]-R)^2 + (g[i]-G)^2 + (b[i]-B)^2 \quad (2)$$

In equation (2), "R", "G" and "B" denote the luminance values of the R, G and B components contained in the pixel data outputted by the signal processing unit 35, and "r[i]", "g[i]" and "b[i]" denote the corresponding luminance values of the R, G and B components contained in the "i"th color data contained in the palette information MC.

In Step 103, it is determined whether counter "i" is 1. When Step 103 is executed for the first time, the counter "i" is 1, and thus, Step 105 is executed. In Step 105, the total sum "E", obtained in Step 102 when the counter "i" is 1, is set as an initial value of the minimum value "Emin". Further, in Step 105, the counter "i" is set as a serial number "Ind"0 of the color data which has been selected. In step 106, the counter "i" is incremented by 1. In Step 107, it is determined whether counter "i" is greater than 256. When Step 107 is executed for the first time, the counter "i" is less than or equal to 256, and thus, the process goes back to Step 102.

Then, Step 102 is again executed, so that the total sum "E" is calculated. Since it is determined in Step 103 that the counter "i" is not equal to 1, Step 104 is executed, in which it is determined whether the total sum "E", obtained in Step 102, is less than or equal to the minimum value "Emin". When the total sum "E" is less than or equal to the minimum value "Emin", Step 105 is executed. Namely, this new total sum "E" is now set as the minimum value "Emin", and counter "i" corresponding to this total sum "E" is set as the serial number "Ind" of the selected color data. Conversely, when the total sum "E" obtained in Step 102 is greater than the minimum value "Emin", Step 105 is skipped. Then, Steps 106 and 107 are executed, so that a loop formed by Steps 102 through 107 is repeatedly executed until the counter "i" passes 256.

While this process is executed, if it is determined in Step 107 that counter "i" has passed 256, Step 108 is executed, in which the color data (r[Ind], g[Ind], b[Ind]), by which the total sum "E" becomes the minimum, is selected as the color data (R', G', B'), corresponding to the pixel data, from the color data contained in the palette information MC. Thus, this program ends with respect to one pixel data.

As described above, in the embodiment, when a color image, which is generated in a computer, for example, according to the 256-color mode is compressed according to the JPEG algorithm, the palette information MC of the 256-color mode is recorded in the recording medium M, together with the compressed image data. Therefore, when the compressed image data are expanded, each pixel data is allocated to that which is the closest to the color data contained in the palette information MC. Accordingly, the deterioration of the image quality can be minimized even if the compression ratio in the compression process is high and, further, the deterioration of the image is minor even if the compression and expansion processes are repeated.

Further, in the embodiment, when pixel data of the full-color mode are converted to color data of the 256-color mode, the process is simple, since the process only selects color data in such a manner that the value "E", being the total sum of the squares of the differences among the R, G and B components, becomes a minimum.

Further, the compressed image data, which have been compressed by the image compression device 20 and recorded in the recording medium M, are conformed to the format of the JPEG. Accordingly, even if the compressed image data are expanded by a conventional image expansion device, a usual expansion process can be performed, so that an image, being close to the original image, can be reproduced.

Note that the present invention can be applied to a device in which the number of color data, indicating the pixel data contained in the original image data, is less than that of the color data contained in the palette information used in the image compression device. Also, the number of color data is not restricted to that of the above described embodiment.

Further note that, as a method of image compression, an image compression other than the JPEG algorithm can be applied.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-247258 (filed on Aug. 29, 1996) which is expressly incorporated herein by reference, in its entirety.

What is claimed is:

1. An image expansion device that expands compressed image date recorded in a recording medium, in which palette information representing predetermined color data formed by combining a red (R) component, a green (G) component and a blue (B) component, is also recorded, said palette information comprising a color generation table representing variations of colors for each pixel in an uncompressed image, said image expansion device comprising:

an image reading processor that reads said compressed image data from said recording medium;

an information reading processor that reads said palette information from said recording medium;

a pixel data reproducing processor that expands said compressed image data to reproduce pixel data; and a color data selection processor that selects one of said predetermined color data corresponding to said reproduced pixel data based on a combination of a luminance value of each of said R component, said G component, and said B component forming said pixel data obtained by said pixel data reproducing processor.

2. A device according to claim 1, wherein said pixel data reproducing processor expands said compressed image data to obtain luminance data and color difference data, and reproduces said pixel data based on said luminance data and said color difference data.

3. The image expansion device of claim 1, wherein the combination is the closest to the color of the original pixel.

4. The image expansion device of claim 3, wherein the closest combination to the color of the original pixel is determined based upon a comparison of the luminance values forming said reproduced pixel data and luminance values for each of a plurality of colors of said predetermined color data.

5. The image expansion device of claim 1, wherein the combination of luminance values for the selected color is the closest to the combination of luminance values for the reproduced pixel data.

6. An image expansion device that expands compressed image data recorded in a recording medium, in which palette information composed of a predetermined number of color data formed by combining a red (R) component, a green (G) component and a blue (B) component, is also recorded, said image expansion device comprising:

an image reading processor that reads said compressed image data from said recording medium;

an information reading processor that reads said palette information from said recording medium;

a pixel data reproducing processor that expands said compressed image data to reproduce pixel data; and a color data selection processor that selects one of said predetermined number of color data corresponding to said pixel data, based on said R component, said G component and said B component forming said pixel data obtained by said pixel data reproducing processor, said color data being contained in said palette information, wherein said color data selection processor selects said one of said color data contained in said palette information, based on a total sum of a square of a difference between a first luminance value of each of said R component, said G component and said B component forming said pixel data obtained by said pixel data reproducing processor, and a second luminance value of each of said R component, said G component and said B component forming said predetermined number of color data contained in said palette information.

7. A device according to claim 6, wherein said color data selection processor selects one of said predetermined number color data in such a manner that said total sum becomes a minimum value.

* * * * *